United States Patent
Park et al.

(10) Patent No.: US 12,482,096 B2
(45) Date of Patent: Nov. 25, 2025

(54) APPARATUS AND METHOD FOR MEDICAL IMAGE PROCESSING ACCORDING TO LESION PROPERTY

(71) Applicant: CLARIPI INC., Seoul (KR)

(72) Inventors: Hyun Sook Park, Seoul (KR); Chang Yong Heo, Seoul (KR); Tae Jin Kim, Seoul (KR); Tae Yoon Lim, Seongnam-si (KR); Je Myoung Lee, Goyang-si (KR)

(73) Assignee: CLARIPI INC., Seoul (KR)

( * ) Notice: Subject to any disclaimer, the term of this patent is extended or adjusted under 35 U.S.C. 154(b) by 725 days.

(21) Appl. No.: 17/868,314

(22) Filed: Jul. 19, 2022

(65) Prior Publication Data

US 2023/0029394 A1    Jan. 26, 2023

(30) Foreign Application Priority Data

Jul. 22, 2021    (KR) .................. 10-2021-0096565

(51) Int. Cl.
*G06K 9/00* (2022.01)
*G06T 3/40* (2006.01)
(Continued)

(52) U.S. Cl.
CPC .............. *G06T 7/0012* (2013.01); *G06T 3/40* (2013.01); *G16H 30/40* (2018.01);
(Continued)

(58) Field of Classification Search
CPC ..................... G06T 7/0012; G06T 3/40; G06T 2207/10081; G06T 2207/20081;
(Continued)

(56) References Cited

U.S. PATENT DOCUMENTS 7,218,766 B2 * 5/2007 Eberhard ............... A61B 6/463
                                                    382/131
10,588,589 B2 * 3/2020 Bregman-Amitai ..... G06N 5/02
(Continued)

FOREIGN PATENT DOCUMENTS

EP    3828833 A1 *  6/2021  ............ A61B 6/032
JP    2021-83821 A    6/2021
(Continued)

OTHER PUBLICATIONS

The Extended European Search Report for European Patent Application No. 22185320.3, dated Dec. 23, 2022.

*Primary Examiner* — Shervin K Nakhjavan

(57) ABSTRACT

Disclosed are an apparatus and method for medical image processing according to pathologic lesion properties, the method including: recognizing a readout area different from an original readout area in a medical image by applying a previously trained deep learning model to the medical image, extracting properties, which include at least one of a location and a size of the readout area, from the medical image, and generating a readout image for the readout area, which is different from the original readout area corresponding to a purpose of taking the medical image, by reconstructing the medical image, thereby having an effect on generating a readout image for a different kind of pathologic lesion from a previously acquired medical image.

14 Claims, 7 Drawing Sheets

(51) Int. Cl.
*G06T 7/00* (2017.01)
*G16H 30/40* (2018.01)

(52) U.S. Cl.
CPC .............. *G06T 2207/10081* (2013.01); *G06T 2207/20081* (2013.01); *G06T 2207/30012* (2013.01); *G06T 2207/30048* (2013.01); *G06T 2207/30096* (2013.01)

(58) Field of Classification Search
CPC . G06T 2207/30012; G06T 2207/30048; G06T 2207/30096; G06T 2207/20084; G06T 2207/20101; G06T 11/006; G16H 30/40
See application file for complete search history.

(56) References Cited

U.S. PATENT DOCUMENTS

| | | | | |
|---|---|---|---|---|
| 10,776,919 | B2* | 9/2020 | Kuratomi | G06T 7/74 |
| 11,049,244 | B2* | 6/2021 | Wang | G06V 10/764 |
| 11,074,688 | B2* | 7/2021 | Chabin | G06T 7/73 |
| 11,145,060 | B1* | 10/2021 | Schudlo | G16H 50/20 |
| 11,170,508 | B2* | 11/2021 | Avital | A61B 5/0042 |
| 11,308,612 | B2* | 4/2022 | Putha | G06V 10/774 |
| 11,399,790 | B2* | 8/2022 | Chui | G06T 17/10 |
| 11,521,317 | B2* | 12/2022 | Chiang | G06T 11/60 |
| 11,615,530 | B2* | 3/2023 | Takeshima | G06T 5/60 |
| | | | | 382/128 |
| 11,922,627 | B2* | 3/2024 | Min | A61B 5/055 |
| 11,941,802 | B2* | 3/2024 | Xu | G06F 18/41 |
| 11,954,853 | B2* | 4/2024 | Bernard | G06T 7/0012 |
| 12,014,492 | B2* | 6/2024 | Wimberger-Friedl | |
| | | | | G06V 10/751 |
| 12,125,199 | B2* | 10/2024 | Oh | G06T 7/0012 |
| 12,257,041 | B2* | 3/2025 | Bang | A61B 5/055 |
| 12,277,710 | B2* | 4/2025 | Nishide | G16H 50/20 |
| 2003/0215120 | A1* | 11/2003 | Uppaluri | A61B 6/505 |
| | | | | 382/128 |
| 2006/0177125 | A1* | 8/2006 | Chan | G06T 7/44 |
| | | | | 382/128 |
| 2019/0057504 | A1* | 2/2019 | Kobayashi | G06F 18/2415 |
| 2020/0163550 | A1* | 5/2020 | Igarashi | G16H 40/63 |
| 2021/0361167 | A1* | 11/2021 | Wolfe | G16H 30/40 |
| 2023/0074296 | A1* | 3/2023 | Wang | G06T 7/0012 |
| 2023/0104945 | A1* | 4/2023 | Mao | G06T 7/0012 |
| | | | | 382/128 |
| 2024/0112339 | A1* | 4/2024 | Masumoto | G16H 30/40 |
| 2024/0144474 | A1* | 5/2024 | Park | G06N 3/08 |
| 2024/0221158 | A1* | 7/2024 | Sasaki | G06T 7/00 |

FOREIGN PATENT DOCUMENTS

| | | |
|---|---|---|
| JP | 6930283 B2 | 9/2021 |
| KR | 10-2014-0134903 A | 11/2014 |
| KR | 10-2097743 B1 | 4/2020 |
| KR | 10-2021-0000553 A | 1/2021 |
| WO | 2019/135234 A1 | 7/2019 |

* cited by examiner property extracting

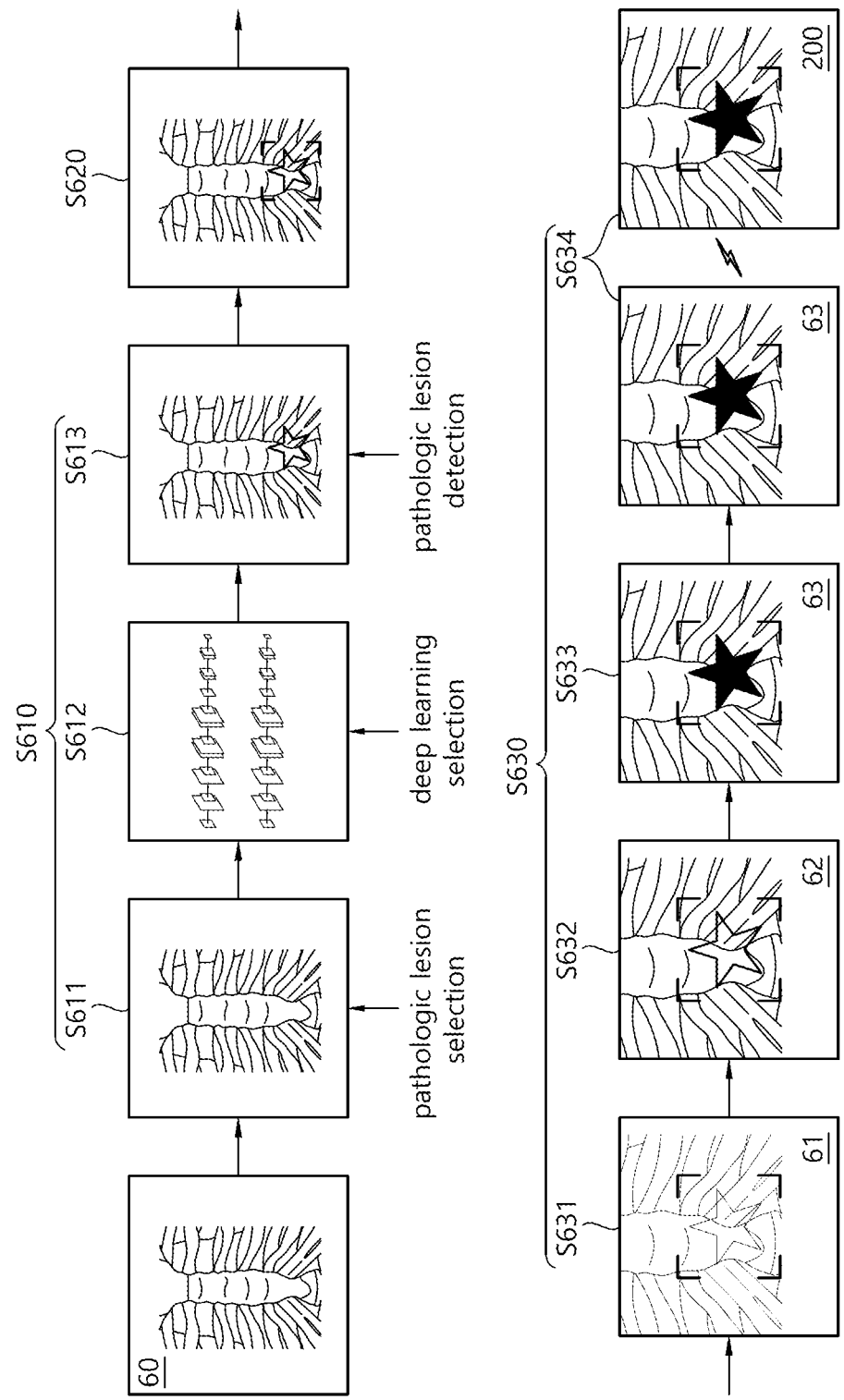

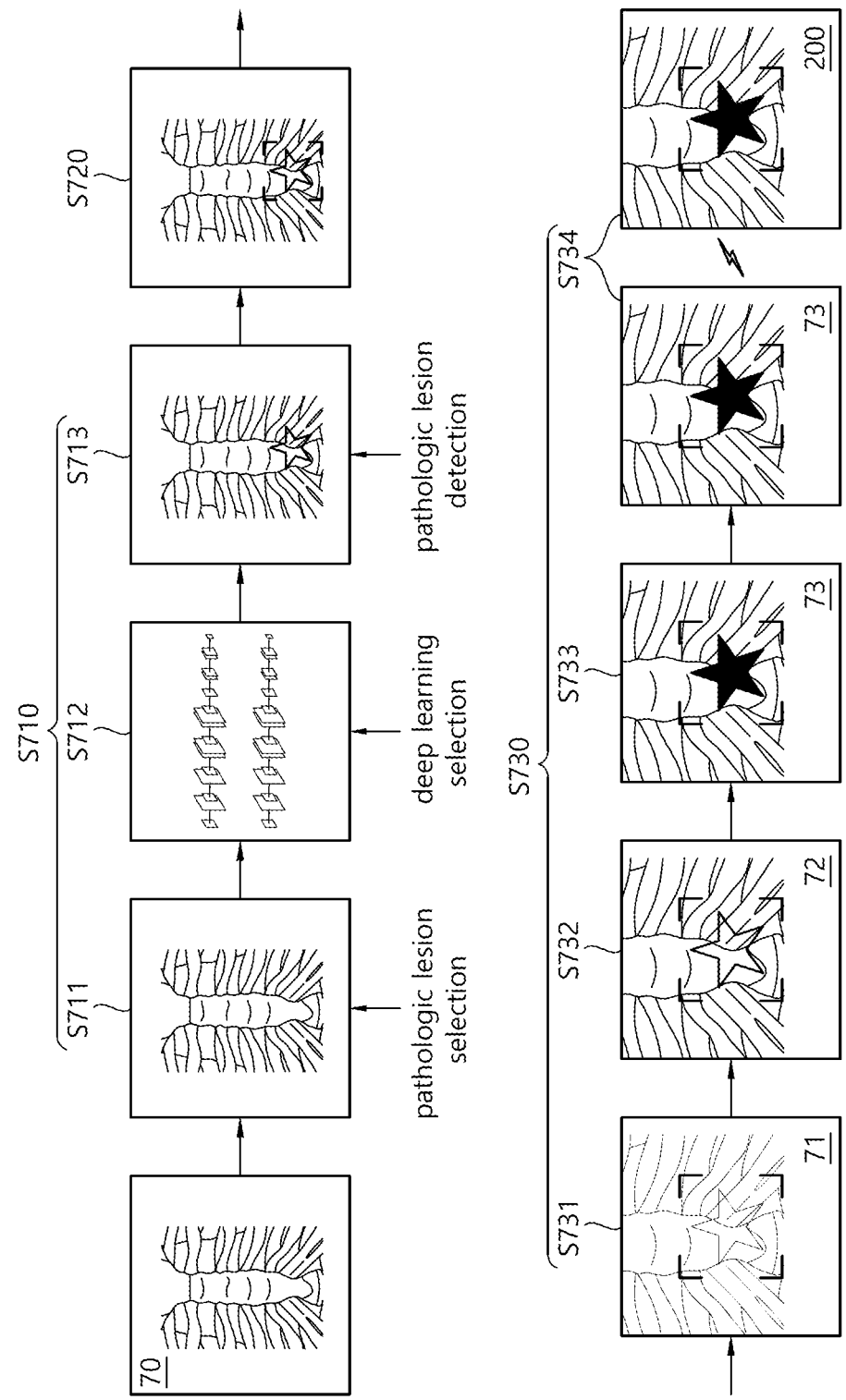

APPARATUS AND METHOD FOR MEDICAL IMAGE PROCESSING ACCORDING TO LESION PROPERTY

CROSS REFERENCE TO RELATED APPLICATION

Pursuant to 35 U.S.C. § 119 (a), this application claims the benefit of Korean Patent Application No. 10-2021-0096565, filed on Jul. 22, 2021, the contents of which are all hereby incorporated by reference herein in their entirety.

BACKGROUND OF THE INVENTION

Field of the Invention

The disclosure relates to an apparatus and method for medical image processing according to lesion properties, and more particularly to an apparatus and method for medical image processing according to lesion properties, in which a lesion is detected from a medical image.

Description of the Related Art

Medical imaging equipment such as an X-ray scanner, a computed tomography (CT) scanner, and a magnetic resonance imaging (MRI) scanner is generally being used in acquiring medical images. In modern medical science, the medical images acquired from such medical imaging equipment are employed as very important bases for making a decision by determining the presence and properties of a pathologic lesion in the process of diagnosing and treating a patient. However, the pathologic lesion has various sizes, shapes and directions, and it is therefore required to acquire high-quality images so as to precisely observe and grasp the properties of the pathologic lesion.

The art related to medical image processing has already been disclosed in Korean Patent Publication No. 2014-0134903 (titled "Method and apparatus for improving quality of medical image," and published on Nov. 25, 2014). This related art improves the quality of a low-quality medical image based on the noise correction coefficient of the medical image. In this way, in terms of examining a medical image, it is very essentially required to acquire a high-quality image.

In particular, the medical image is varied in resolution and frequency characteristics for each direction depending on the arrangement, angle, signal acquisition procedure, etc., of a detection device, which are set in the process of acquiring the medical image. Thus, it is necessary for controlling an acquisition device so that the properties of a pathologic lesion to be observed can be displayed on the medical image. However, if a new pathologic lesion is found in addition to a pathologic lesion to be observed originally, it may be difficult to grasp the properties of the new pathologic lesion in the previously acquired image. In this case, an imaging examination is additionally required according to the properties of the new pathologic lesion in spite of the presence of the previously acquired image.

Therefore, a patient's visit and an additional examination are required, thereby wasting time and causing inconvenience. Besides, the patient has to be exposed again to radiation harmful to a human body. Accordingly, the process of examining the medical image needs to have a function of acquiring and processing an image not to delay a patient diagnosis or cause additional inconvenience while a reading doctor observes a pathologic lesion.

DOCUMENTS OF RELATED ART

Patent Document

Korean Patent Publication No. 2014-0134903 (titled "Method and apparatus for improving quality of medical image," and published on Nov. 25, 2014)

SUMMARY OF THE INVENTION

An aspect of the disclosure is to provide an apparatus and method for medical image processing according to lesion properties.

Another aspect of the disclosure is to provide an apparatus and method for medical image processing according to pathologic lesion properties, in which a new pathologic lesion is appropriately displayed without performing an additional examination when the new pathologic lesion is found in a previously acquired medical image.

Still another aspect of the disclosure is to provide an apparatus and method for medical image processing according to pathologic lesion properties, which allow a reader to appropriately observe the properties of a detected pathologic lesion based on previously acquired image data when the presence of a new pathologic lesion is found in a previously acquired medical image and the pathologic lesion is detected.

An image processing method according to an embodiment of the disclosure includes: recognizing a readout area different from an original readout area in a medical image by applying a previously trained deep learning model to the medical image; extracting properties, which include at least one of a location and a size of the readout area, from the medical image; and generating a readout image for the readout area, which is different from the original readout area corresponding to a purpose of taking the medical image, by reconstructing the medical image.

The recognizing may include selecting a pathologic lesion expected to be detected from the medical image; selecting a deep learning model capable of detecting the pathologic lesion among a plurality of deep learning models; and recognizing the readout area encompassing the pathologic lesion by applying the selected deep learning model to the medical image.

The recognizing may include performing preprocessing corresponding to the selected deep learning model to improve efficiency of detecting the pathologic lesion before applying the selected deep learning model to the medical image.

The generating the readout image may include resizing the pathologic lesion in the medical image to emphasize the pathologic lesion according to the properties of the pathologic lesion encompassed by the readout area.

The resizing may include resizing the pathologic lesion by arranging the pathologic lesion to be shown in a central area of an image, and magnifying the image.

The generating the readout image may include converting image characteristics to emphasize the pathologic lesion according to the properties of the pathologic lesion encompassed by the readout area.

The converting the image characteristics may include converting at least one of a resolution and component of the medical image.

The medical image may include a chest or abdominal computed tomography (CT) image, the pathologic lesion may include a vertebral fracture, and the converting the image characteristics may include converting the image characteristics of the medical image to emphasize a high frequency component of the medical image.

The medical image may include a CT image, the pathologic lesion may include a cardiovascular lesion, and the converting the image characteristics may include converting the image characteristics of the medical image by adjusting an emphasis frequency band of the medical image.

The generating the readout image may include reconstructing an image to emphasize the pathologic lesion according to the properties of the pathologic lesion encompassed by the readout area.

The reconstructing may include reconstructing the slices of the medical image.

The medical image may include a chest or abdominal computed tomography (CT) image, the pathologic lesion may include a vertebral fracture, and the reconstructing the image may include reconstructing the medical image with respect to a sagittal axis to emphasize a pattern of the vertebral fracture.

The medical image may include a chest or abdominal computed tomography (CT) image, the pathologic lesion may include a cardiovascular lesion, and the reconstructing the image may include reconstructing the medical image by curved planar reformation to emphasize a pattern of the cardiovascular lesion.

The generating the readout image may include: generating a resized image by resizing the pathologic lesion in the medical image to emphasize the pathologic lesion according to the properties of the pathologic lesion encompassed by the readout area, generating an image-characteristic converted image by converting at least one of a resolution and component of the resized image to emphasize the pathologic lesion according to the properties of the pathologic lesion, and generating a reconstructed image by reconstructing slices of the image-characteristic converted image to emphasize the pathologic lesion according to the properties of the pathologic lesion.

Meanwhile, an image processing apparatus according to an embodiment of the disclosure includes: a detector configured to recognize a readout area different from an original readout area in a medical image by applying a previously trained deep learning model to the medical image; a property extractor configured to extract properties, which include at least one of a location and a size of the readout area, from the medical image; and an image processor configured to generate a readout image for the readout area, which is different from the original readout area corresponding to a purpose of taking the medical image, by reconstructing the medical image.

Meanwhile, an image processing apparatus according to an embodiment of the disclosure includes: a processor configured to process a medical image received from at least one of medical imaging equipment and a database, the processor including: recognizing a readout area different from an original readout area in a medical image by applying a previously trained deep learning model to the medical image, extracting properties, which include at least one of a location and a size of the readout area, from the medical image, and generating a readout image for the readout area, which is different from the original readout area corresponding to a purpose of taking the medical image, by reconstructing the medical image.

According to the disclosure, an apparatus and method for medical image processing according to pathologic lesion properties have effects as follows.

First, according to the disclosure, a medical image is subjected to image processing according to the properties of a pathologic lesion, so that the properties of a new pathologic lesion found in addition to a pathologic lesion to be observed originally can be appropriately displayed on a previously acquired image, thereby having an effect on making an image diagnosis without performing an additional examination.

Second, according to the disclosure, a medical image is subjected to image processing according to the properties of a pathologic lesion, so that an image diagnosis can be made without performing an additional examination, thereby having effects on preventing wasted time and inconvenience due to a patient's visit and the additional examination.

Third, according to the disclosure, a medical image is subjected to image processing according to the properties of a pathologic lesion, so that an image diagnosis can be made without performing an additional examination, thereby having an effect on avoiding the additional examination causing radiation harmful to a human body.

The technical effects of the disclosure are not limited to the foregoing effects, and other technical effects not mentioned above will be clearly understood by those skilled in the art from the following descriptions.

BRIEF DESCRIPTION OF THE DRAWINGS

FIG. 6 is a conceptual view showing a method of generating a readout image for a vertebral fracture by inputting a chest or abdominal computed tomography (CT) image to an image processing apparatus according to an embodiment of the disclosure, and FIG. 7 is a conceptual view showing a method of generating a readout image for a cardiovascular lesion by inputting a chest or abdominal CT image to an image processing apparatus according to an embodiment of the disclosure.

DETAILED DESCRIPTION OF THE INVENTION

Figure 1:
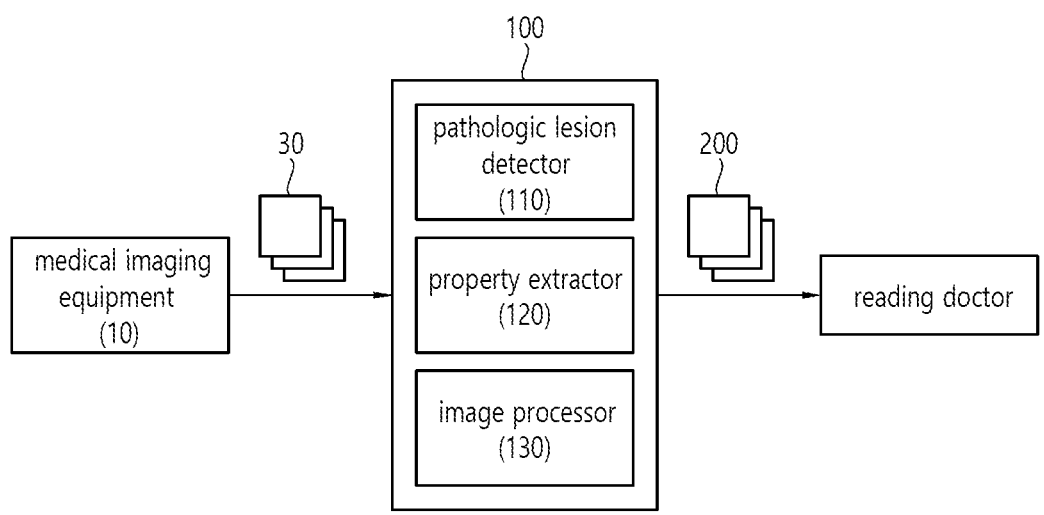
FIG. 1 is a conceptual view schematically showing an image processing apparatus according to an embodiment of the disclosure.

Hereinafter, embodiments of the disclosure will be described in detail. The disclosure may, however, be embodied in various forms and should not be construed as limited to the embodiments set forth herein. Rather, these embodiments are provided so that the disclosure can be thorough and complete and fully convey the scope of the disclosure to a person having ordinary knowledge in the art. In the drawings, the shapes or the like of elements may be exaggerated for the clarity of description, and like reference numerals refer to like elements.

FIG. 1 is a conceptual view schematically showing an image processing apparatus according to an embodiment of the disclosure.

As shown in FIG. 1, an image processing apparatus 100 according to an embodiment of the disclosure generates a readout image 200 by acquiring a medical image from medical imaging equipment 10.

Here, the medical imaging equipment 10 may include an X-ray scanner, a computed tomography (CT) scanner, and a magnetic resonance imaging (MRI) scanner, etc., but there are no limits to the kinds of medical imaging equipment 10.

Further, the readout image 200 may be an image that shows a pathologic lesion different from a lesion for which the medical image 30 is taken. In other words, the medical image 30 may be an image taken to detect a 'pathologic lesion A', but the readout image 200 may be an image that is used to read a 'pathologic lesion B' different from the 'pathologic lesion A.'

The image processing apparatus 100 may include a pathologic lesion detector 110, a property extractor 120, and an image processor 130. However, there are no limits to the configuration of the image processing apparatus 100. Alternatively, such a series of processes such as pathologic lesion detecting, property extracting, image processing, etc., may be performed in a single processor such as a computer system or a plurality of processors.

The image processing apparatus 100 receives the medical image 30 from the medical imaging equipment 10. Alternatively, the image processing apparatus 100 may receive the medical image from a database (not shown).

Thus, the image processing apparatus 100 may detect a pathologic lesion from the medical image 30. For example, the pathologic lesion detector 110 detects a pathologic lesion different from a pathologic lesion, which corresponds to the actual purpose of taking the medical image 30, from the medical image 30 based on a previously trained deep learning model.

Further, the image processing apparatus 100 may extract the properties of the detected pathologic lesion. For example, the property extractor 120 may extract the properties of the detected pathologic lesion based on the previously trained deep learning model or an image processing technique.

In addition, the image processing apparatus 100 may generate a readout image 200 by performing image processing according to the extracted properties of the pathologic lesion. For example, the image processor 130 may generate the readout image 200 based on the previously trained deep learning model or the image processing technique.

Below, a readout-image generating method based on the image processing apparatus according to an embodiment of the disclosure will be described in detail with reference to the accompanying drawings. However, the foregoing elements will be described avoiding repetitive descriptions and using like reference numerals.

Figure 2:
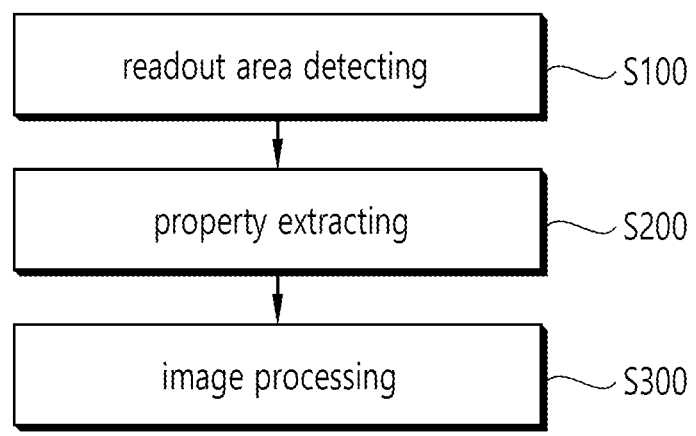
FIG. 2 is a flowchart showing a readout-image generating method using an image processing apparatus according to an embodiment of the disclosure.

FIG. 2 is a flowchart showing a readout-image generating method using the image processing apparatus according to an embodiment of the disclosure.

As shown in FIG. 2, the image processing apparatus 100 according to an embodiment of the disclosure recognizes a readout area including a pathologic lesion different in kind from a pathologic lesion, which corresponds to the actual purpose of taking the medical image 30, from the medical image 30. In this case, the image processing apparatus 100 may detect the pathologic lesion by applying the previously trained deep learning model to the medical image 30.

Figure 3:
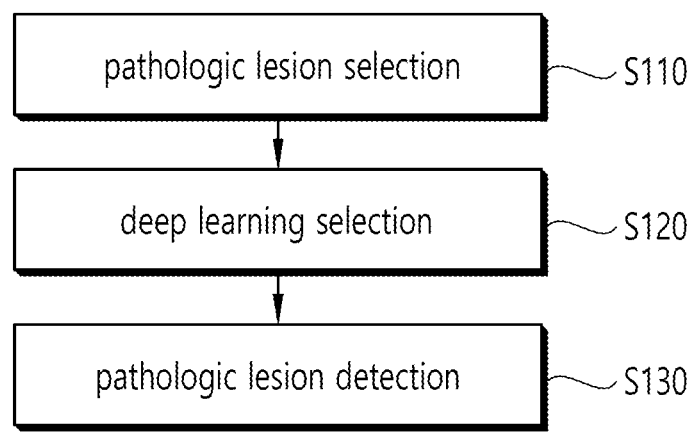
FIG. 3 is a flowchart showing a pathologic-lesion detecting method in a readout-image generating method according to an embodiment of the disclosure.

For example, as shown in FIG. 3, pathologic lesion detecting S100 based on the image processing apparatus 100 may include pathologic lesion selection S110, deep learning selection S120, and pathologic lesion detection S130, which are carried out in sequence.

First, in the pathologic lesion selection S110, the kind of pathologic lesion expected to be detected from the medical image 30 is selected. In this case, the kind of pathologic lesion may be selected automatically or manually.

Further, in the deep learning selection S120, the type of previously trained deep learning model is selected according to the kinds of pathologic lesion. In other words, the image processing apparatus 100 may include a plurality of deep learning models. Each of the plurality of deep learning models may be used to detect a different pathologic lesion. Thus, in the deep learning selection S120, a deep learning model suitable for the selected pathologic lesion may be automatically or manually selected among the plurality of deep learning models.

Further, in the pathologic lesion detection S130, a pathologic lesion different from that corresponding to the actual image taking purpose is detected based on the selected deep learning model. In other words, in the pathologic lesion detection S130, a different kind of pathologic lesion is detected from the medical image 30 by applying the selected deep learning model to the medical image 30.

Here, the image processing apparatus 100 may preprocess the medical image 30 before the pathologic lesion selection S110, thereby facilitating the detection of the previously trained deep learning model in the medical image 30.

Figure 4:
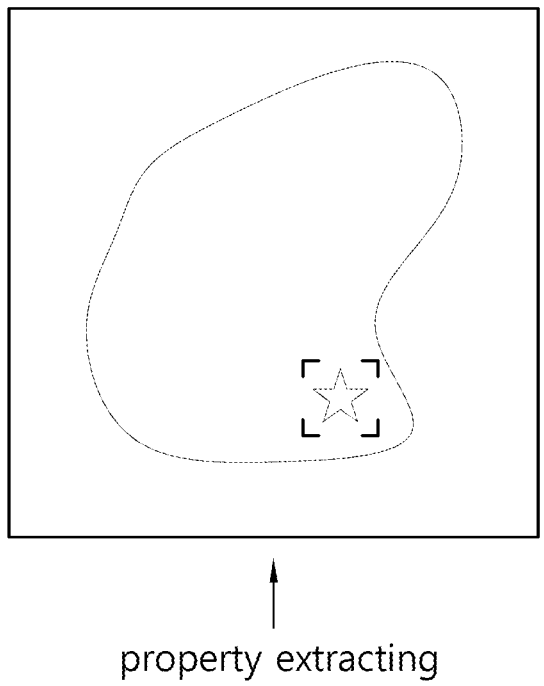
FIG. 4 is a conceptual view showing a property extraction method in a readout-image generating method according to an embodiment of the disclosure.

Meanwhile, the image processing apparatus 100 performs property extracting S200 after the pathologic lesion detecting S100. As shown in FIG. 4, in the property extracting S200, the location and size of the pathologic lesion detected from the medical image 30 are extracted.

Further, the image processing apparatus 100 performs image processing S300 after the property extracting S200.

Figure 5:
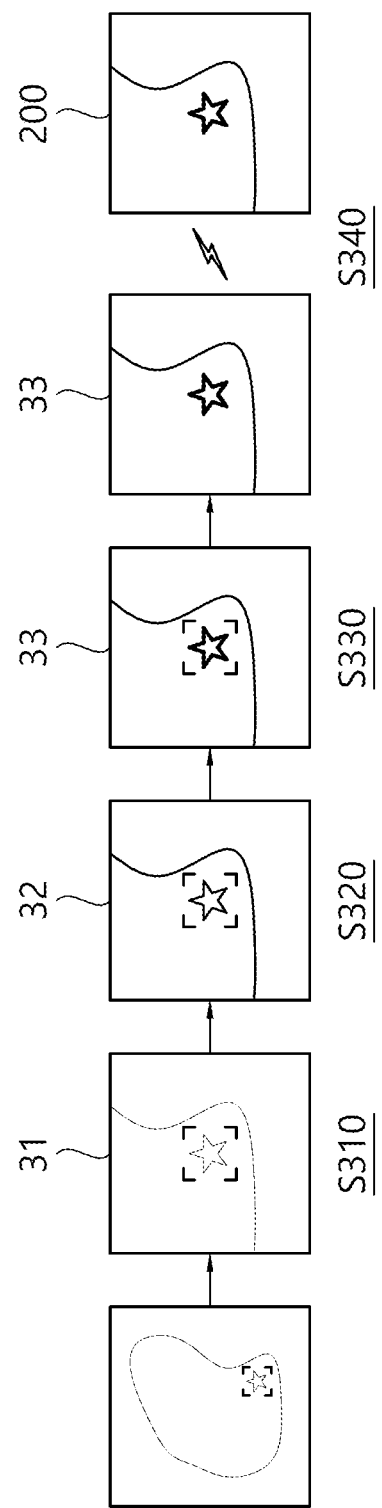
FIG. 5 is a conceptual view showing an image processing method in a readout-image generating method according to an embodiment of the disclosure.

For example, as shown in FIG. 5, the image processing apparatus 100 may perform resizing S310, image characteristic conversion S320, reconstruction S330, and transmission S340 selectively or together for the image processing S300.

First, in the resizing S310, the medical image 30 from which the properties of a pathologic lesion are extracted, i.e., the medical image 30 from which the location and size of the pathologic lesion are detected may be magnified at a predetermined ratio. For example, in the resizing S310, a resized image 31 may be generated by arranging the extracted pathologic lesion to be shown in a central area and magnifying the medical image 30.

Further, in the image characteristic conversion S320, the image characteristics of the resized image 31 may be converted according to the properties of the pathologic lesion. For example, in the image characteristic conversion S320, an image-characteristic converted image 32 changed in image characteristics may be generated by converting the resolution, components, etc., of the resized image 31.

Further, in the reconstruction S330, the reconstruction may be performed based on previously set rules according to the properties of the pathologic lesion. For example, in the reconstruction S330, a reconstructed image 33 may be generated by reconstructing the slices of the image-characteristic converted image 32 to clearly show the pathologic lesion.

Then, in the transmission S340, the reconstructed image 33 may be transmitted as the readout image 200 to a reading doctor. For example, in the transmission S340, the readout image 200 may be transmitted to a previously designated computer system. Thus, the reading doctor can observe and diagnose a pathologic lesion different in kind from a pathologic lesion, which corresponds to the actual purpose of taking the medical image 30, based on the readout image 200.

Below, use of various input medical images based on the image processing apparatus according to an embodiment of the disclosure will be described in detail with reference to the accompanying drawings. However, the foregoing elements will be described avoiding repetitive descriptions and using like reference numerals.

First, the image processing apparatus 100 according to an embodiment of the disclosure may generate the readout image 200 for a vertebral fracture from a chest or abdominal CT image 60.

FIG. 6 is a conceptual view showing a method of generating a readout image for a vertebral fracture by inputting a chest or abdominal CT image to an image processing apparatus according to an embodiment of the disclosure.

As shown in FIG. 6, the medical image 30 input to the image processing apparatus 100 according to an embodiment of the disclosure may include the chest or abdominal CT image 60. For example, the image processing apparatus 100 generates the readout image 200 for the vertebral fracture by applying pathologic lesion detecting S610, property extracting S620, and the image processing S630 to the chest CT image 60. In other words, according to an embodiment, the readout image 200 is generated for the vertebral fracture that is commonly not easily observed and diagnosed in the chest CT image 60.

First, in the pathologic lesion detecting S610, the chest CT image 60 is subjected to pathologic lesion selection S611, deep learning selection S612, and pathologic lesion detection S613.

In the pathologic lesion selection S611, the kind of pathologic lesion expected to be detected from the chest CT image 60 is selected. In this case, the pathologic lesion selected in the pathologic lesion selection S611 may be the vertebral fracture. In general, the vertebral fracture is not the pathologic lesion expected to be detected from the chest CT image 60. Therefore, the chest CT image 60 is not suitable to observe and diagnose the vertebral fracture.

However, when the vertebral fracture is selected with respect to the chest CT image 60 in the pathologic lesion selection S611, the image processing apparatus 100 selects the type of deep learning model corresponding to the vertebral fracture among the plurality of types of deep learning models in the deep learning selection S612. Then, the pathologic lesion is detected by the selected deep learning model in the pathologic lesion detection S613.

In other words, the image processing apparatus 100 detects the presence or absence of the vertebral fracture by applying the deep learning model previously trained for detecting the vertebral fracture to the chest CT image 60. In this case, the chest CT image 60 may be preprocessed so as to improve the performance of the deep learning model in detecting the vertebral fracture.

Meanwhile, when the vertebral fracture is found in the chest CT image 60 through the deep learning model, the image processing apparatus 100 performs the property extracting S620. In the property extracting S620, the properties of the vertebral fracture, which include the size or location of the vertebral fracture, may be extracted.

Further, the image processing apparatus 100 applies the image processing to the chest CT image 60.

In the image processing S630, the chest CT image 60 is subjected to resizing S631, image characteristic conversion S632, reconstruction S633, and transmission S634.

First, in the resizing S631, a resized image 61 is generated by resizing the chest CT image 60 to be suitable to observe the vertebral fracture. For example, the location of the vertebral fracture is arranged to be shown in a central area. Then, the chest CT image 60 is magnified so that the vertebral fracture can be observed and diagnosed, thereby generating the resized image 61.

Thus, after the resized image 61 is generated, the image processing apparatus 100 may perform the image characteristic conversion S632. For example, in the image characteristic conversion S632, an image-characteristic converted image 62 may be generated by emphasizing a high frequency component in the resized image 61.

Further, the image processing apparatus 100 may perform the reconstruction S633 with respect to the image-characteristic converted image 62, the high frequency component of which is emphasized. For example, in the reconstruction S633, the image-characteristic converted image 62 may be reconstructed with respect to a sagittal axis so that the pattern of the vertebral fracture can be easily observed, thereby generating a reconstructed image 64.

After the reconstructed image 64 is generated, the image processing apparatus 100 may perform the transmission S634. For example, in the transmission S634, the reconstructed image 64 may be transmitted to a computer system previously designated for a reading doctor.

Thus, the reading doctor can observe and diagnose the vertebral fracture through the readout image 200 generated based on the chest CT image 60.

Meanwhile, the image processing apparatus 100 according to an embodiment of the disclosure may generate the readout image 200 for a cardiovascular lesion from a chest or abdominal CT image 70.

FIG. 7 is a conceptual view showing a method of generating a readout image for a cardiovascular lesion by inputting a chest or abdominal CT image to an image processing apparatus according to an embodiment of the disclosure.

As shown in FIG. 7, the medical image 30 input to the image processing apparatus 100 according to an embodiment of the disclosure may include the chest or abdominal CT image 70. For example, the image processing apparatus 100 may generate the readout image 200 for the cardiovascular lesion by applying pathologic lesion detecting S710, property extracting S720, and image processing S730 to the chest CT image 70. In other words, according to an embodiment, the readout image 200 is generated for the cardiovascular lesion that is commonly not easily observed and diagnosed in the chest CT image 60.

First, in the pathologic lesion detecting S710, the chest CT image 70 is subjected to pathologic lesion selection S711, deep learning selection S712, and pathologic lesion detection S713.

In the pathologic lesion selection S711, the kind of pathologic lesion expected to be detected from the chest CT image 70 is selected. In this case, the pathologic lesion selected in the pathologic lesion selection S711 may be the cardiovascular lesion. In general, the cardiovascular lesion is not the pathologic lesion expected to be detected from the chest CT image 70. Therefore, the chest CT image 70 is not suitable to observe and diagnose the cardiovascular lesion.

However, when the cardiovascular lesion is selected with respect to the chest CT image 70 in the pathologic lesion selection S711, the image processing apparatus 100 selects the type of deep learning model corresponding to the cardiovascular lesion among the plurality of types of deep learning models in the deep learning selection S712. Then, the pathologic lesion is detected by the selected deep learning model in the pathologic lesion detection S713.

In other words, the image processing apparatus 100 detects the cardiovascular lesion by applying the deep learning model previously trained for detecting the cardiovascular lesion to the chest CT image 70. In this case, the chest CT image 70 may be preprocessed so as to improve the performance of the deep learning model in detecting the cardiovascular lesion.

Meanwhile, when the cardiovascular lesion is found in the chest CT image 70 through the deep learning model, the image processing apparatus 100 performs the property extracting S720. In the property extracting S720, the properties of the cardiovascular lesion, which include the size or location of the cardiovascular lesion, may be extracted.

Further, the image processing apparatus 100 applies the image processing S730 to the chest CT image 70.

In the image processing S730, the chest CT image 70 is subjected to resizing S731, image characteristic conversion S732, reconstruction S733, and transmission S734.

First, in the resizing S731, a resized image 71 is generated by resizing the chest CT image 70 to be suitable to observe the cardiovascular lesion. For example, in the resizing S731, the location of the cardiovascular lesion is arranged to be shown in a central area, and then the chest CT image 70 is magnified so that the cardiovascular lesion can be observed and diagnosed, thereby generating the resized image 71.

Thus, after the resized image 71 is generated, the image processing apparatus 100 may perform the image characteristic conversion S732. For example, in the image characteristic conversion S732, an image-characteristic converted image 72 may be generated by adjusting an emphasis frequency band.

Further, the image processing apparatus 100 may perform the reconstruction S733 with respect to the image-characteristic converted image 72 adjusted in the emphasis frequency band. For example, in the reconstruction S733, the image-characteristic converted image 72 may be subjected to curved planar reformation so that the pattern of the cardiovascular lesion can be easily observed, thereby generating a reconstructed image 73.

After the reconstructed image 73 is generated, the image processing apparatus 100 may perform the transmission S734. For example, in the transmission S734, the reconstructed image 73 may be transmitted to a computer system previously designated for a reading doctor.

Thus, the reading doctor can observe and diagnose the cardiovascular lesion through the readout image generated based on the chest CT image 70.

As above, an image processing apparatus according to an embodiment of the disclosure generates a readout image for a different kind of pathologic lesion from a previously acquired medical image, thereby having effects as follows.

First, according to the disclosure, a medical image is subjected to image processing according to the properties of a pathologic lesion, so that the properties of a new pathologic lesion found in addition to a pathologic lesion to be observed originally can be appropriately displayed on a previously acquired image, thereby having an effect on making an image diagnosis without performing an additional examination.

Second, according to the disclosure, a medical image is subjected to image processing according to the properties of a pathologic lesion, so that an image diagnosis can be made without performing an additional examination, thereby having effects on preventing wasted time and inconvenience due to a patient's visit and the additional examination.

Third, according to the disclosure, a medical image is subjected to image processing according to the properties of a pathologic lesion, so that an image diagnosis can be made without performing an additional examination, thereby having an effect on avoiding the additional examination causing radiation harmful to a human body.

The embodiments of the disclosure described above and illustrated in the accompanying drawings should not be construed as limiting the technical idea of the disclosure. The scope of the disclosure is limited by only the matters defined in the appended claims, and the technical idea of the disclosure is improved and modified in various forms by a person having ordinary knowledge in the art. Accordingly, such improvement and modification, which are obvious to a person having ordinary knowledge in the art, will fall within the scope of the disclosure.

What is claimed is:

1. An image processing method comprising:
   recognizing a readout area different from an original readout area in a medical image by applying a previously trained deep learning model to the medical image;
   extracting properties, which comprise at least one of a location and a size of the readout area, from the medical image; and
   generating a readout image for the readout area, which is different from the original readout area corresponding to a purpose of taking the medical image, by reconstructing the medical image,
   wherein the generating the readout image comprises converting image characteristics to emphasize a pathologic lesion according to properties of the pathologic lesion encompassed by the readout area, and
   wherein the converting the image characteristics comprises converting a resolution, or a component, or both of the medical image.

2. The image processing method of claim 1, wherein the recognizing comprises:
   selecting the pathologic lesion expected to be detected from the medical image;
   selecting a deep learning model capable of detecting the pathologic lesion among a plurality of deep learning models; and
   recognizing the readout area encompassing the pathologic lesion by applying the selected deep learning model to the medical image.

3. The image processing method of claim 2, wherein the recognizing comprises performing preprocessing corresponding to the selected deep learning model to improve efficiency of detecting the pathologic lesion before applying the selected deep learning model to the medical image.

4. The image processing method of claim 1, wherein the generating the readout image comprises resizing the pathologic lesion in the medical image to emphasize the pathologic lesion according to the properties of the pathologic lesion encompassed by the readout area.

5. The image processing method of claim 4, wherein the resizing comprises resizing the pathologic lesion by arranging the pathologic lesion to be shown in a central area of an image, and magnifying the image.

6. The image processing method of claim 1, wherein
   the medical image comprises a chest or abdominal computed tomography (CT) image, the pathologic lesion comprises a vertebral fracture, and
the converting the image characteristics comprises converting the image characteristics of the medical image to emphasize a high frequency component of the medical image.

7. The image processing method of claim 1, wherein
the medical image comprises a chest or abdominal computed tomography (CT) image,
the pathologic lesion comprises a cardiovascular lesion, and
the converting the image characteristics comprises converting the image characteristics of the medical image by adjusting an emphasis frequency band of the medical image.

8. The image processing method of claim 1, wherein the generating the readout image comprises reconstructing an image to emphasize the pathologic lesion according to the properties of the pathologic lesion encompassed by the readout area.

9. The image processing method of claim 8, wherein the reconstructing comprises reconstructing slices of the medical image.

10. The image processing method of claim 8, wherein
the medical image comprises a chest or abdominal computed tomography (CT) image,
the pathologic lesion comprises a vertebral fracture, and
the reconstructing the image comprises reconstructing the medical image with respect to a sagittal axis to emphasize a pattern of the vertebral fracture.

11. The image processing method of claim 8, wherein
the medical image comprises a chest or abdominal computed tomography (CT) image,
the pathologic lesion comprises a cardiovascular lesion, and
the reconstructing the image comprises reconstructing the medical image by curved planar reformation to emphasize a pattern of the cardiovascular lesion.

12. The image processing method of claim 1, wherein the generating the readout image comprises:
generating a resized image by resizing the pathologic lesion in the medical image to emphasize the pathologic lesion according to the properties of the pathologic lesion encompassed by the readout area,
generating an image-characteristic converted image by converting a resolution, or a component, or both of the resized image to emphasize the pathologic lesion according to the properties of the pathologic lesion, and
generating a reconstructed image by reconstructing slices of the image-characteristic converted image to emphasize the pathologic lesion according to the properties of the pathologic lesion.

13. An image processing apparatus comprising:
a detector configured to recognize a readout area different from an original readout area in a medical image by applying a previously trained deep learning model to the medical image;
a property extractor configured to extract properties, which comprise at least one of a location and a size of the readout area, from the medical image; and
an image processor configured to generate a readout image for the readout area, which is different from the original readout area corresponding to a purpose of taking the medical image, by reconstructing the medical image,
wherein the image processor is configured to generate the readout image by converting image characteristics to emphasize a pathologic lesion according to properties of the pathologic lesion encompassed by the readout area, and
wherein the image processor is configured to convert the image characteristics by converting a resolution, or a component, or both of the medical image.

14. An image processing apparatus comprising a processor configured to perform processing with respect to a medical image received from at least one of medical imaging equipment and a database,
wherein the processor performs:
recognizing a readout area different from an original readout area in a medical image by applying a previously trained deep learning model to the medical image,
extracting properties, which comprise at least one of a location and a size of the readout area, from the medical image, and
generating a readout image for the readout area, which is different from the original readout area corresponding to a purpose of taking the medical image, by reconstructing the medical image,
wherein the generating the readout image comprises converting image characteristics to emphasize a pathologic lesion according to properties of the pathologic lesion encompassed by the readout area, and
wherein the converting the image characteristics comprises converting a resolution, or a component, or both of the medical image.

* * * * *